United States Patent [19]

McDonald

[11] Patent Number: 5,266,091
[45] Date of Patent: Nov. 30, 1993

[54] AIR CLIMATE CONTROL SYSTEM REGISTER FILTER

[76] Inventor: Craig J. McDonald, P.O. Box 0268, Utica, Mich. 48318

[21] Appl. No.: 34,309

[22] Filed: Mar. 22, 1993

[51] Int. Cl.$^5$ .............................................. B01D 46/10
[52] U.S. Cl. ........................................ 55/373; 55/381; 55/493; 55/495; 454/284; 454/289
[58] Field of Search ............... 55/369, 373, 380, 381, 55/490, 493, 495, 496, 509, 511, DIG. 31; 454/284, 289

[56] References Cited

U.S. PATENT DOCUMENTS

| | | |
|---|---|---|
| 450,322 | 4/1991 | Segal . |
| 637,519 | 11/1899 | Mertins . |
| 1,037,145 | 8/1912 | Houser, Jr. . |
| 1,385,502 | 7/1921 | Smith . |
| 1,429,811 | 9/1922 | Tynan . |
| 1,694,089 | 12/1928 | Wright . |
| 2,080,726 | 5/1937 | Lowinger . |
| 3,474,599 | 10/1969 | Schwab .................. 55/511 X |
| 3,778,985 | 12/1973 | Daigle et al. ............ 55/511 X |
| 4,128,408 | 12/1978 | Poole ...................... 55/509 X |
| 4,129,428 | 12/1978 | Andersson et al. ...... 55/509 X |
| 4,363,643 | 12/1982 | Elbrader et al. ........ 55/DIG. 31 X |
| 4,999,038 | 3/1991 | Lundberg ................ 55/495 X |

*Primary Examiner*—Charles Hart
*Attorney, Agent, or Firm*—Basile and Hanlon

[57] ABSTRACT

An air filter for use in combination with a climate control system having a register with an outwardly extending perimeter flange and an exposed surface, the outwardly extending perimeter flange supporting the register when the register is installed over an aperture formed in a support surface. The air filter includes porous material for filtering air emanating from the system with limited restriction of air flow caused by the porous material covering the register which, when not covered, would allow air to flow from the system unrestricted. The air filter slips over the register with excess material extending beyond the perimeter flange of the register and folded under the perimeter flange for securing the porous material to the register by interposing the porous material between the perimeter flange and the support surface.

15 Claims, 2 Drawing Sheets

AIR CLIMATE CONTROL SYSTEM REGISTER FILTER

FIELD OF THE INVENTION

The present invention generally relates to filtration of air in climate control systems and, more particularly, is concerned with filtration of air emanating from climate control air registers located at the final distribution point of the system.

BACKGROUND OF THE INVENTION

Reducing the amount of foreign particles in indoor living and working areas is a large concern for people affected by breathing such particles. Indoor climate control systems are an abundant source of these particles and filtration of the air emanating from these systems has been widely practiced.

Filtering of the air emanating from an indoor climate control system has been practiced in the past by using filtering means at the main source of the system's air as well as at the air registers located at the final distribution point of the air in the system. Filters at the air registers used in the past, however, inadequately filter the air, are cumbersome and create a obstruction in the working and living environments.

One device that has been proposed to filter air at the air climate control register is a box-like apparatus made from a perforated sheet of pre-cut cardboard which can be folded into its proper shape by the ultimate user. The apparatus further provides for a filter material fastened to an open surface of the device for filtering and release of forced air from the hot air system for which it was designed. Finally, the apparatus includes a flange made by bending a section of the perforated cardboard pattern for securing the device to the register while in use. The patent attempts to provide for an efficient and convenient air filter device, however, it has serious drawbacks.

One major drawback of the device and other variations of it is that it is inconvenient to use. The mere presence of the raised box style creates an obstruction in the living or working environment inhibiting free movement. The filter box can be kicked, crushed or tripped over by people in normal movement about the environment. Also, the box device requires partial assembly before use, making it a less desirable option. A second drawback is that the box-type filter is difficult to clean since the filter cloth is attached to the cardboard frame. Finally, the box-type design restricts registers with adjustable air flow valves from properly directing air flowing from the system.

Consequently, a need exists for a convenient device for filtering air emanating from an air climate control system.

SUMMARY OF THE INVENTION

The present invention seeks to improve filtering means used in conjunction with air climate control system registers by providing a slip-on device for the registers made of a porous material for filtering foreign particles from the air released from the air climate control system into the living or working environment while, at the same time, remaining hidden away from traffic in the environment by being installed flush with the system register. The air filter device further provides for a colorable, ornate and durable object for interior design applications that is easier to clean than the system's main filter. The air filter device also provides for prevention of rattling noises resulting from registers mounted on hard surfaces and vibrated by air forced from the climate control system and prevents foreign objects from falling into the system.

The present invention provides for an air filter device for use in combination with a climate control system having a register with an outwardly extending perimeter flange and an exposed surface. The outwardly extending perimeter flange supports the register when the register is installed with respect to an aperture in a support surface. The air filter can include porous material means for filtering air emanating from the system with limited restriction of air flow caused by the porous material covering the aperture, which when not covered, would allow air to flow from the climate control system unrestricted. The porous material means covering the exposed surface of the register with excess material extending beyond the perimeter flange of the register and folded under the perimeter flange for securing the porous material means to the register by interposing the porous material means between the perimeter flange and the supporting surface.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

Figure 1:
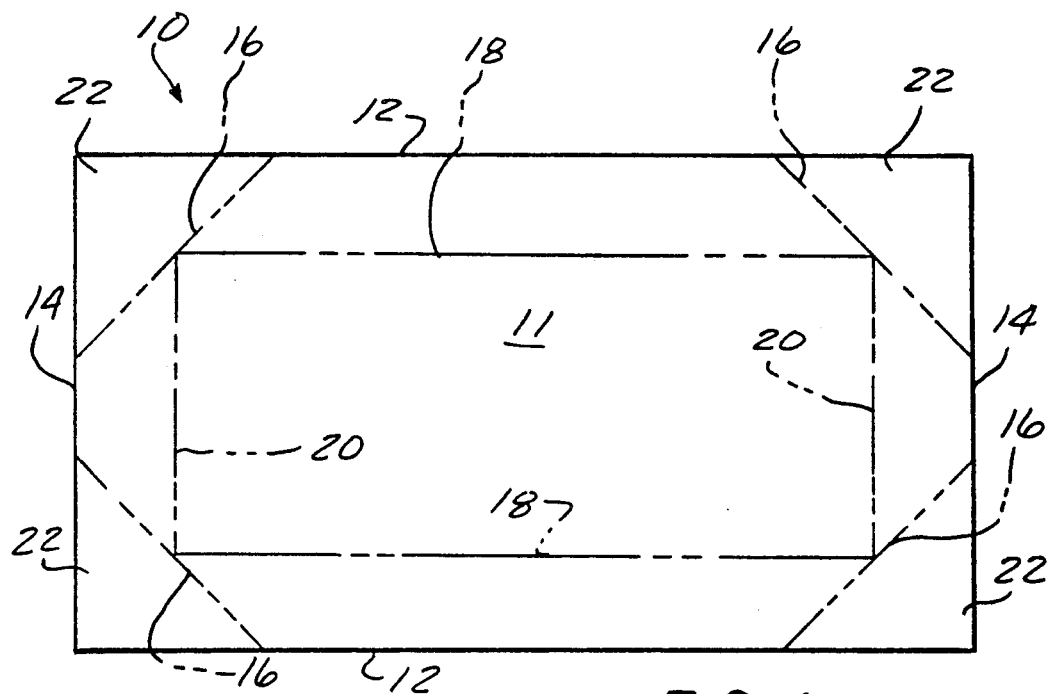
FIG. 1 is a top view of the present invention in its form prior to the cutting and folding process.

Referring now to the drawings, and more particularly, to FIG. 1, there is shown a top view of the air filter apparatus, generally designated 10, prior to the cutting and folding process which forms the preferred embodiment of the present invention. The air filter 10 includes a porous material with a top surface 11 cut from a predetermined pattern defined by cut lines 12, 14 and 16 for forming a generally rectangular planar cut pattern and for removing corners 22. The illustrated embodiment is further defined by fold lines 18, 20. Of course, it should be apparent that other geometric shapes and configurations can be formed according to the present invention without departing from the spirit and scope of the disclosure herein, and that the rectangular configuration shown in FIGS. 1-5 is for illustration purposes.

Figure 2:
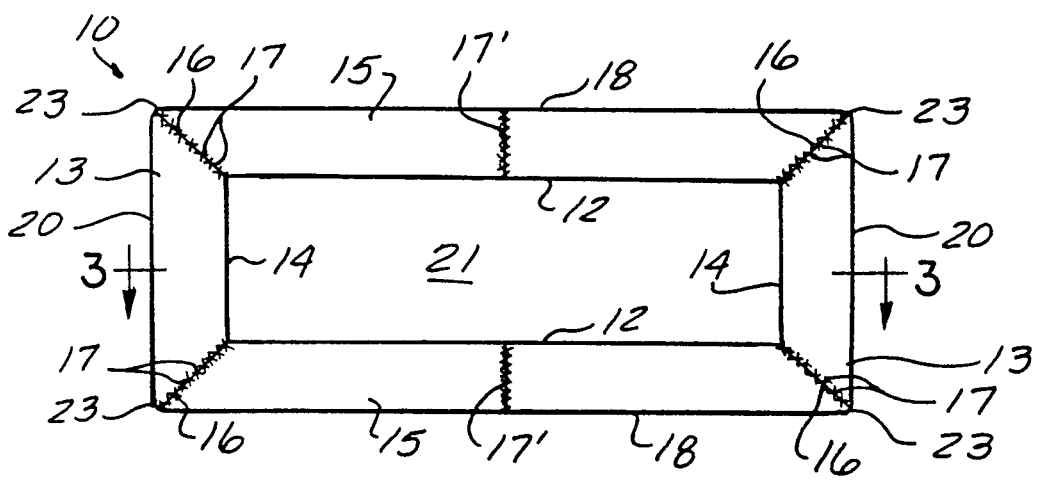
FIG. 2 is a bottom view of the present invention after the cutting and folding process.

After the cutting step, sides 13, 15 are folded at fold lines 18, 20 approximately 180° to overlap a bottom surface 21 of the porous material. As shown in FIG. 2, where adjacent edges of sides formed by cut lines 16 are joined by stitching 17 or other fastening means such as heat seamed, chemical bonded or mechanically held together. The folding step additionally creates a peripheral edge with edges 12a, 14a, fragments of edges 12, 14 respectively in FIG. 1, and rounded corners 23 to prevent fabric fraying at said corners.

Figure 3:
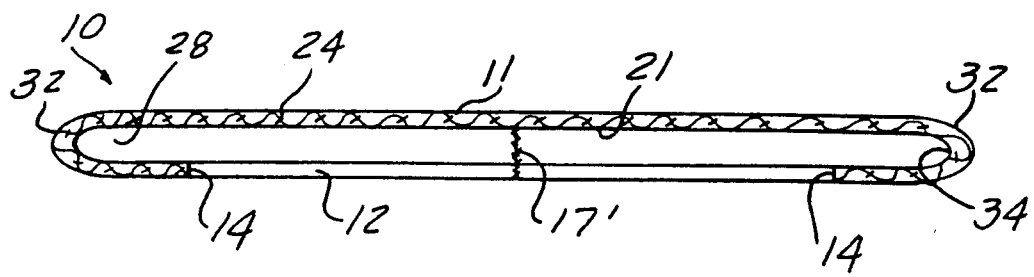
FIG. 3 is a cross-sectional view of the present invention taken on line 3—3 of FIG. 2.

A cross-sectional view of the present invention is illustrated in FIG. 3 showing air filter 10 made from porous material 10A of thickness T sufficient to allow filtration of air of pollen, dust and other harmful foreign particles without significantly restricting the free flow of air emanating from the climate control system. As shown at 28 in FIG. 3, clearance is provided for insertion of a register 36 (shown in FIG. 4). Clearance 28 extends around the perimeter for the air filter 10 from fold line 20 and fold line 18 to cut edges 14 and 12 respectively. Further included in the present invention are outside and inside round edges 32 and 34 respectively resulting from folding edges 18, 20. The inside round edge 34 defines an inner peripheral edge surface 30 spaced outwardly from inner peripheral edges 12, 14.

Figure 4:
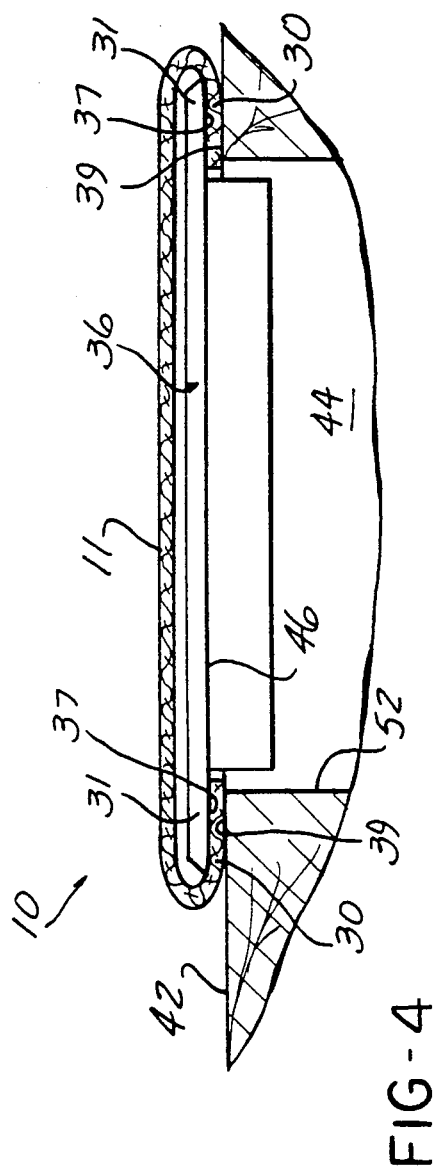
FIG. 4 is the cross-section of FIG. 3 shown installed on an air climate control register mounted on a surface.

FIG. 4 shows the cross-section of air filter 10 of FIG. 3 installed on an air climate control system register 36. The air register 36 is then mounted on support surface 42 covering system air duct 44. The air filter 10 and register 36 assembly are removably mounted onto support surface 42 with air filter 10 interposed between outwardly extending peripheral flanges 31 formed on register 36 and support surface 42. Air filter 10 includes register-filter contact surface 37 and filter-mounting contact surface 39. Contact surfaces 37 and 39 secure the air filter 10 in place on register 36 by gravitational force on the register 36 if secured to a surface or by compression if register 36 is mounted to a wall or ceiling support surface by attachment means (not shown).

Figure 5:
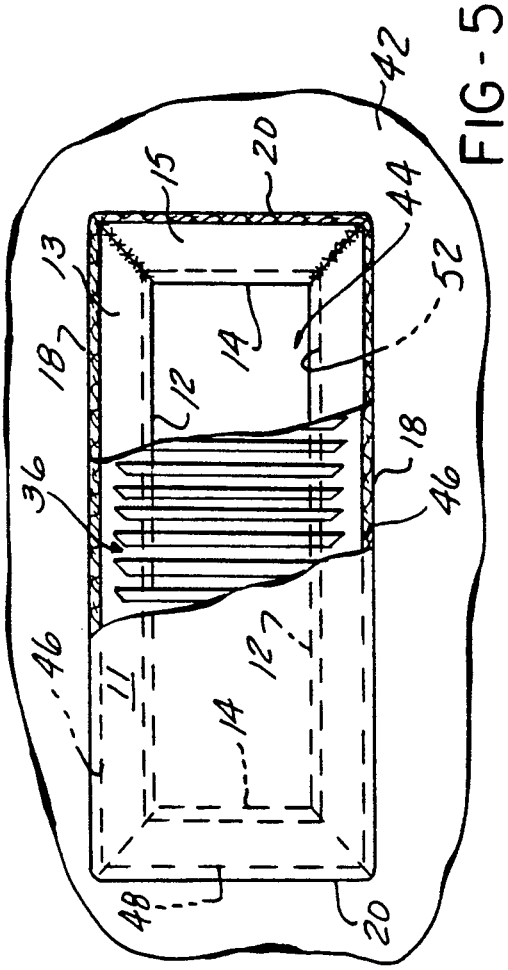
FIG. 5 is a top cut-away view of the present invention installed on an air climate control register mounted on a support surface.

A top view of the air filter 10 and register assembly mounted on support surface 42 with cut-away sections of the assembly displaying interaction of parts is shown in FIG. 5. Top surface 11 of air filter 10 is shown covering a top portion of the register 36 extending beyond peripheral flange edges 46, 48 of register 36. Sides 13, 15 fold under peripheral flange 31 (shown in FIG. 4) at fold lines 18, 20. The overlapping portion of air filter 10 extends under the peripheral flange 31 up to and slightly beyond edge 52 defining an aperture in the support surface 42. The inner peripheral edges 12, 14 are of sufficient size to anchor the air filter 10 between the register 36 and support surface 42 while still allowing free flow of air emanating from system air duct 44 through surface opening 44, then through register 36 and finally through air filter 10.

The preferred embodiment of the present invention involves an air filter 10 for use in combination with a climate control system having a register 36 with an outwardly extending perimeter flange 31 of a length L2 and a width W2 and an exposed surface. The outwardly extending perimeter flange 31 supports the register 36 when the register is installed over an opening in a support surface communicating with a distribution passage of the climate control system. The air filter 10 includes a porous material 10A that allows filtration of air with limited restriction of normal system air flow caused by partial blocking of the opening by the porous material 10A. The porous material 10A is cut from a predetermined pattern, wherein the pattern defines a rectangle having length L1 and width W1 each respectively proportional to length L2 and width W2 of the perimeter flange 31 where L1 is greater than L2 and W1 is greater than W2. Excess porous material is defined by an area surrounding the register, when the register 36 is centered on the rectangularly cut porous material 10A and extending beyond the perimeter flange 31 to allow folding of the excess material approximately 180°, thus, overlapping the perimeter flange 31. The predetermined pattern further includes sections cut from the rectangle for forming folded over corners of the rectangularly cut porous material 10A which are removed by way of the pattern cut. The porous material 10A also has an elastic potential such to allow said porous material 10A with one end of the porous material 10A held stationary to stretch at least two directions at the distance approximately from line of the fold to the edge of the excess material to allow the porous material 10A to be removably attached to the flange 31 by slidably installing the non-stationary end of the porous folded material 10A over one side of the peripheral flange 31 with each of the two respectively proportional lengths and widths adjacent to each respective corresponding lengths and stretching the opposite end of the porous material 10A over the opposite corresponding edge of the flange 31 so as to allow the excess material to slip over opposite end of the flange 31. This provides for security of the porous material 10A to the flange 31 during use by gravitational force exerted on the porous material 10A by the register 36. The air filter 10 finally includes fastening means for securing the adjacent edges of the folded excess material brought together as a result of the fold.

Figure 7:
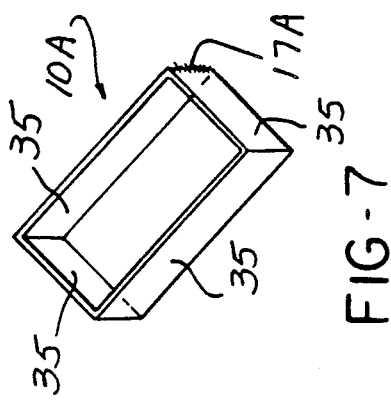
FIG. 7 is a perspective view of the second embodiment of FIG. 6.
Figure 6:
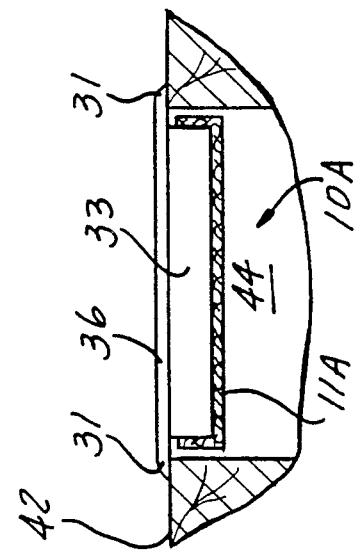
FIG. 6 is a cross-section of a second embodiment of the present invention shown mounted on the climate control register.

A second embodiment of the present invention includes a porous material like the preferred embodiment and is installed on an unexposed surface of the air climate control register 36 as shown in FIGS. 6 and 7. For this second embodiment, the register 36 has a rectangular duct 33 attached to the register 36 and extending into an opening 44 in the mounting surface 42 which is covered by the register 36. The porous material 10A extends over the duct opening 44 and slips over the sides 35 of the duct 33 for filtering the air emanating from the air climate control system at the unexposed surface of the register 36. The filter 10A of the second embodiment has a filtering surface 11A covering the duct opening 44 and peripheral sides 35 extending perpendicular to the filtering surface with adjacent edges of each side fastened to each other with fastening means 17A to allow a secure elastic slip fit over the peripheral sides 35 of the duct 33.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An air filter for use in combination with a climate control system having a register with an outwardly extending perimeter flange and an exposed surface said outwardly extending perimeter flange supporting said register when said register is installed with respect to an aperture in a support surface communicating with a distribution passage of said climate control system, said air filter comprising:

porous material means for filtering air emanating from said system with limited restriction of normal system air flow caused by partial blocking of said aperture by said porous material means, said porous material means covering said exposed surface of said register and having excess material extending beyond said perimeter flange of said register, said excess material folded under said perimeter flange for securing said porous material means to said register by interposing said porous material means between said perimeter flange and said support surface.

2. The air filter of claim 1, wherein said porous material means is secured to said register by gravitational forces exerted vertically downward on said excess material by said register by interposing said excess material folded under said perimeter flange between said perimeter flange and said support surface.

3. The air filter of claim 2 further comprising fastening means for connecting and fastening at least two sides of said excess material together for positioning said porous means with respect to said register.

4. The air filter of claim 1, wherein said porous material means further comprise fastening means for holding said register onto said surface, said porous material means being secured to said register by forces exerted on said air filter by securing means attaching said register to said support surface and said porous material means folded under said perimeter flange interposed between said perimeter flange and said support surface.

5. The air filter of claim 4 further comprising fastening means for connecting and fastening at least two sides of said excess material together for positioning said porous material means with respect to said register.

6. The air filter of claim 1, wherein said perimeter flange has a length L2 and a width W2, wherein said porous material is cut from a predetermined pattern wherein said pattern defines a rectangle having a length L1 and width W1 each respectively proportional to length L2 and width W2 of said perimeter flange where L1 is greater than L2 and W1 is greater than W2 and excess porous material defined by an area surrounding said register when said register is centered on said rectangularly cut porous material extends beyond said perimeter flange to allow folding of said excess material approximately 180° under said perimeter flange.

7. The air filter of claim 6, wherein said predetermined pattern further comprises corner sections cut from said rectangle for forming folded over corners of said rectangularly cut porous material means.

8. The air filter of claim 3, wherein said porous material means further comprises elastic potential such to allow said porous material means with one end of the material held stationary to stretch in at least one direction extending said material from its stationary position toward an opposite end of said peripheral flange, said elastic potential sufficient to stretch a distance approximately from line of said fold to edge of said excess material to allow said porous material to be removably attached to said flange by slidably installing non-stationary end of said porous material over one side of said flange with each of the two said respectively proportional lengths L1, L2 and widths W1, W2 adjacent to each respective corresponding lengths and stretching the opposite end of said porous material over said opposite corresponding edge of the flange so as to allow said excess material to slip over said opposite end of said flange providing security of said porous material to said flange during use by gravitational force exerted on said porous material by said register.

9. An air filter for use in combination with a climate control system having a register with an outwardly extending perimeter flange of a length L2 and a width W2 and an exposed surface, said outwardly extending perimeter flange supporting said register when said register is installed with respect to an aperture in a support surface communicating with a distribution passage of said climate control system, said air filter comprising:

a porous material means allowing filtration of air with limited restriction of normal system air flow caused by partial blocking of said aperture by said porous material means, said porous material means cut from a predetermined pattern, wherein said pattern defines a rectangle having length L1 and width W1 each respectively proportional to length L2 and width W2 of said perimeter flange where L1 is greater than L2 and W1 is greater than W2 and excess porous material defined by an area surrounding said register when said register is centered on said rectangularly cut porous material means extend beyond said perimeter flange to allow folding of said excess material approximately 180°, said predetermined pattern further comprising corner sections cut from said rectangle for forming folded over corners of said rectangularly cut porous material means, said porous material having an elastic potential such to allow said porous material with one end of said porous material held stationary to stretch at least two directions at the distance approximately from line of said fold to edge of said excess material to allow said porous material to be removably attached to said flange by slidably installing non-stationary end of the porous folded material over one side of said peripheral flange with each of the two said respectively proportional lengths and widths adjacent to each respective corresponding lengths and stretching the opposite end of said porous material over the opposite corresponding edge of said flange so as to allow said excess material to slip over opposite end of said flange providing security of said porous material to the flange during use by gravitational force exerted on said porous material by the register; and fastening means for securing adjacent edges of said folded excess material brought together as a result of said fold.

10. A method for manufacturing an air climate control register filter for use in combination with a climate control system having a register with a length L2 and overall width W2, said register having an outwardly extending perimeter flange and an exposed surface said outwardly extending perimeter flange supporting said register when said register is installed with respect to an aperture in a support surface communicating with a distribution passage of said climate control system, the method comprising the steps of:

cutting a porous material means following a predetermined pattern wherein said pattern defines a rectangle of length L1 and width W1 each respectively proportional to said length L2 and said width W2 of said peripheral flange where L1 is greater than L2 and W1 is greater than W2 and excess porous material defined by the area surrounding and extending outward beyond said peripheral flange and said register when said register is centered on said rectangularly cut porous material means, said pattern further defining corner sections of said rectangle for forming said folded over corners of said rectangularly cut porous material means;

folding said excess material approximately 180° to overlap said peripheral flange; and fastening of adjacent edges of said folded excess material brought together as a result of said fold with excess corner material folded inward toward and under said folded excess material by fastening means.

11. The method for manufacturing air filter of claim 10 further comprising the step of:

removing said corners sections for eliminating extra material.

12. The method for manufacturing air filter of claim 10 further comprising the steps of:

pinching of said excess folded material perpendicular to said adjacent fold lines, said pinched material to extend from each said fold line to said cut edge forming said inner peripheral edge; and fastening of said pinches so as to secure said pinched material in gathered position.

13. An air filter for use in combination with a climate control system having a register with an outwardly extending perimeter flange supporting said register when said register is installed with respect to an aperture in a support surface communicating with a distribution passage of said climate control system, said air filter comprising:

porous material means for filtering air emanating from said system with limited restriction of normal system air flow caused by partial blocking of said aperture by said porous material means, said porous material means covering a bottom surface of said register, said excess material folded under said perimeter flange for securing said porous material means to said register by interposing said porous material means between the perimeter flange and said support surface.

14. An air filter for use in combination with a climate control system having a register with an inner peripheral surface defining a duct located on an unexposed surface of said register, an outwardly extending perimeter flange and an exposed surface, said outwardly extending perimeter flange supporting said register when said register is installed with respect to an aperture in a support surface with said peripheral surface extending into said aperture, said aperture communicating with a distribution passage of said climate control system, said air filter comprising:

porous material means for filtering air emanating from said system with limited restriction of normal system air flow caused by partial blocking of said aperture by said porous material means, said porous material being installed over said duct with material extending beyond an edge of said peripheral surface and slip fitting over said peripheral surface securing said porous material to said register.

15. The air filter of claim 14 further comprising:

a filtering surface covering an opening of said duct;

peripheral sides extending perpendicular from said filtering surface with adjacent edges for overlapping said peripheral surface of said duct for securing said porous material to said register; and fastening means for securing the adjacent edges of each said peripheral sides for aiding said peripheral sides in a secure elastic slip fit of said porous material over said duct.

* * * * *